455-603 AU 233 EX

EP8106 XR 3,691,388

X370-112

X53224

United States

Patel

[15] 3,691,388

[45] Sept. 12, 1972

[54] RECEIVER FOR A TIME-DIVISION-MULTIPLEXED TRAIN OF MODULATED PULSES EMPLOYING STROBED PHOTON-DRAG-EFFECT DEVICES

[72] Inventor: Chandra Kumar Naranbhai Patel, Summit, N.J.

[73] Assignee: Bell Telephone Laboratories, Incorporated, Murray Hill, N.J.

[22] Filed: Jan. 25, 1971

[21] Appl. No.: 109,173

[52] U.S. Cl. ......................250/199, 329/144, 356/23

[51] Int. Cl. ......................H04b 9/00

[58] Field of Search ......250/199; 331/94.5; 329/144; 307/88.3; 332/7.51; 356/23

[56] References Cited

OTHER PUBLICATIONS

Ser. No. 75,543, filed 9/25/70, T. S. Kinsel.

R. Broom et al., Demultiplexing of Fast PCM, Institute of Applied Physics, p. 375, 1969.

A. M. Danishevskii, Dragging of Free Carriers etc., Soviet Physics JETP, V. 31, No. 2, p. 292, Aug. 1969.

*Primary Examiner*—Albert J. Mayer

*Attorney*—R. J. Guenther and Arthur J. Torsiglieri

[57] ABSTRACT

There is disclosed a receiver for a time-division-multiplexed train of modulated pulses in which a tandem strobed arrangement of demultiplexing devices for respective channels employ thin wafers of semiconductor material in which a photon-drag effect is sensed. The photon-drag effect is sensitive to the coincidence of oppositely-directed modulated pulses and strobe pulses. A like arrangement for measuring very short optical pulses is disclosed, as is also an alternative method for making the measurement.

5 Claims, 3 Drawing Figures

INVENTOR
C. K. N. PATEL
BY Wilford L. Wisner
ATTORNEY

RECEIVER FOR A TIME-DIVISION-MULTIPLEXED TRAIN OF MODULATED PULSES EMPLOYING STROBED PHOTON-DRAG-EFFECT DEVICES

BACKGROUND OF THE INVENTION

This invention relates to the sensing of optical pulses and to receivers for optical communication systems in which a number of independent information channels are time-division-multiplexed and in which, typically, the information is represented by modulation of the on-off type, such as pulse code modulation. The information channels are said to be time-division-multiplexed when bits of information from each channel are interleaved in time in one-to-one correspondence with bits from all the other channels in a repetitive manner to yield pulse trains in which all channels are represented.

Such a technique appears to be the most desirable technique for communication at optical frequencies and is most effective when a mode-locked laser is used to provide periodic pulses at a relatively high repetition rate. Such pulses from each one of several lasers typically would be modulated with information representing a respective channel before multiplexing.

Some technique for demultiplexing is used at the receiver of such a system to separate the individual channels, so that the pulses representing information in each channel can be detected with meaningful continuity. A basic technique for demultiplexing is based on the recognition that, at any one instant of time, the different channels will be assigned to different positions in space along the propagation path of the light. If we were to strobe the multiplexed stream at the frequency of the single channel, then each channel would be assigned to the same position in space at the time of every strobe occurrence. An array of strobed photosensitive detectors can readily be arranged at the different positions for the respective channels.

Several specific ways for implementing such strobed demodulators have been suggested. Three of these ways have been described by R. F. Broom et al, "-Demultiplexing of Fast Optical Pulse Code Modulation," *Archiv. Elecktr. Übertragung*, Vol. 23, page 375 (July, 1969). A further specific implementation is disclosed in the copending patent application of T. S. Kinsel, Ser. No. 75,543, filed Sept. 25, 1970, now U.S. Pat. No. 3,652,858 and assigned to the assignee hereof. There it is disclosed that demultiplexing can be achieved without power division losses by directing the received multiplexed pulse train and local oscillator or strobe pulses at the channel bit rate in opposite directions through aligned heterodyning detectors, each detector being assigned to a separate channel. Nevertheless, that arrangement requires sophisticated filtering arrangements to separate a signal representative of a coincidence of pulses in the detector from the signal representative of the unidirectional passage of a single pulse through the detector. In addition, that arrangement is cumbersome and too bulky to use for more than a moderate number of channels when photomultipliers are used as the aligned heterodyning detectors.

It is an object of this invention to provide a more compact and versatile alternative for such strobed demultiplexing without power division losses.

SUMMARY OF THE INVENTION

My invention is based in part upon experimental observations of photon-drag effects in low-effective-mass semiconductive materials such as indium antimonide (InSb) in response to optical radiation of about 10 micrometers wavelength. It has been discovered that this process can advantageously occur in relatively thin wafers of such material, thereby causing minimum nonproductive power loss from optical pulses passing therethrough. Other materials, particularly semiconductors, may exhibit a photon-drag effect for radiation of photon energy below the bandgap energy.

A receiver according to a specific embodiment of my invention includes a plurality of wafers of photon-drag-responsive material aligned in the path of the received modulated pulse train and a source of strobe pulses at the channel bit rate directed in the opposite direction through the aligned wafers. The front-to-back photon-drag induced voltage along the light path in the wafer is detected by suitable electrodes connected to the entry and exit surfaces, full-wave rectified and filtered, so that the rectified voltage varies substantially from its average value only during the pulse time slot in which there has been a coincidence of a modulated pulse and a strobe pulse.

While this demultiplexing arrangement is less sensitive than that employing photomultipliers, this lower sensitivity is more than compensated in a system employing a large number of channels by the relatively low background noise level and the low nonproductive use of pulse energy.

Moreover, a distinct advantage of my invention is its extremely fast time response. The speed of response of a receiver according to my invention is practically limited only by the speed of response of the diodes employed in the full wave rectifiers. The inherent time response of the photon-drag effect, as measured by me, is substantially less than 1 nanosecond ($1\times10^{-9}$ seconds).

According to another feature of my invention, a similarly aligned series of wafers subjected to a periodic pulse stream of unknown pulse width and to an oppositely-directed, but similarly periodic pulse stream, can produce a combined output indicative of the unknown pulse width of the first set of pulses by approximately detecting the pathlength of spatial coincidence of the pulses. This technique can be modified for manual operation with a single wafer by moving the single wafer back and forth along the light beam path through the position of spatial coincidence of pulses. The unknown pulse width in time can be calculated directly from the measured pathlength of spatial coincidence of the pulses. Also, the oppositely-directed pulse stream can be obtained by reflection of the transmitted portion of the first pulse stream.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
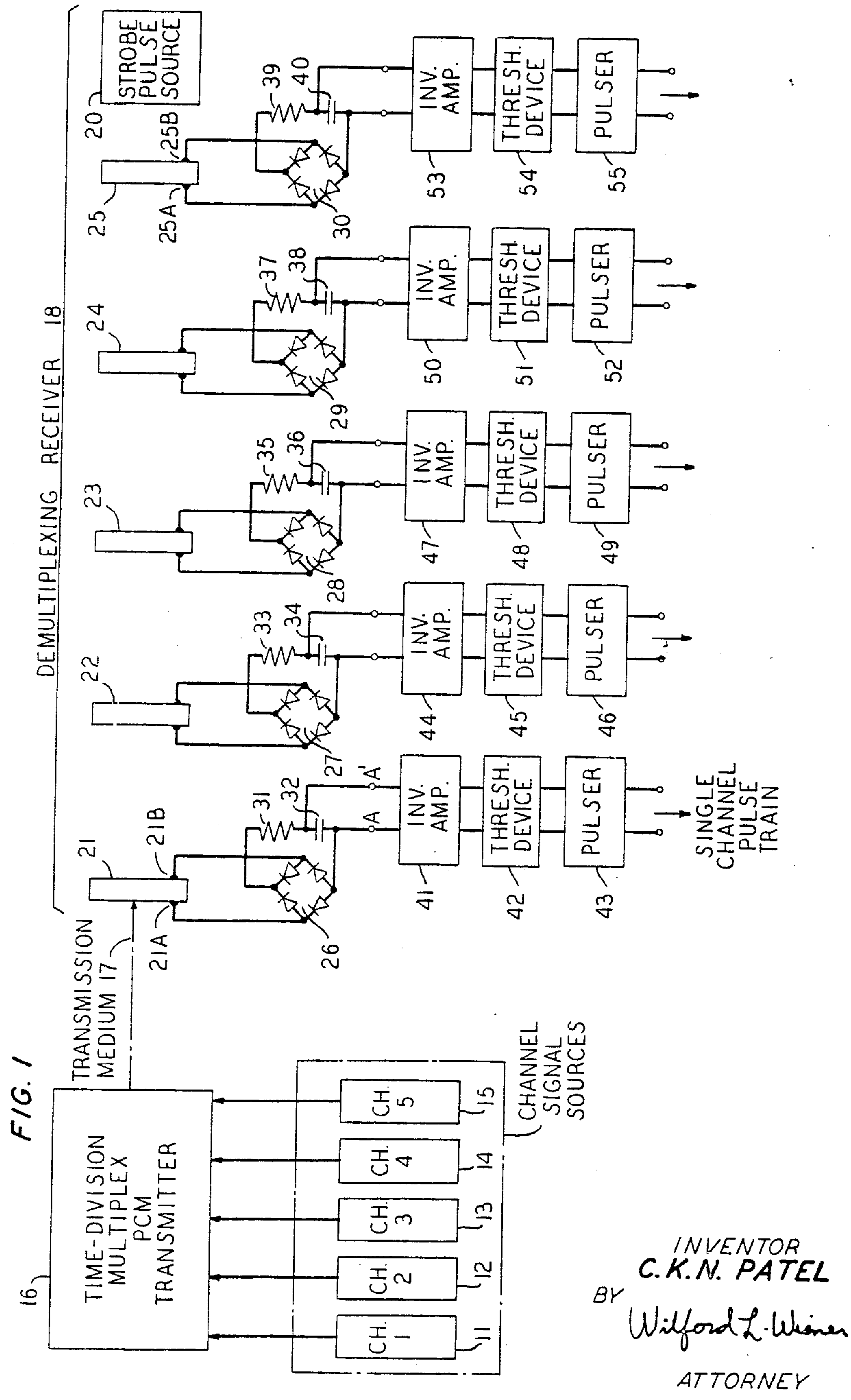
FIG. 1 is a partially pictorial and partially block diagrammatic illustration of a demultiplexing receiver according to my invention, as used in an optical PCM communication system.

In the embodiment of FIG. 1, a time-division-multiplexed pulse stream representative of the signal information from signal sources 11–15 of five different communication channels is transmitted from a transmitter 16 through a transmission medium 17 to the demultiplexing receiver 18, in which the multiplexed pulses are to be separated and employed at respective detectors to produce output signals representative of the information in each of the channels.

Several ways in which an optical PCM transmitter 16 may interleave pulses from different modulators, and thus multiplex the signals from different channels, are known in the art. An illustrative technique is that disclosed in U.S. Pat. No. 3,506,834, issued Apr. 14, 1970 to S. J. Buchsbaum et al. For purposes of illustration, it will be assumed that the multiplexed pulse train has a carrier wavelength of 10.6 microns, as would be the case when the principal coherent power source in transmitter 16 is a carbon dioxide molecular laser operating at that wavelength.

The transmission medium 17 could be the atmosphere or an enclosed transmission medium such as a hollow pipe or optical guide.

The demultiplexing receiver 18 differs from that in the above-cited application of T. S. Kinsel in that heterodyning is not essential to its operation. The strobe pulse source 20 illustratively provides optical pulses at the channel bit rate which also have a carrier wavelength of about 10.6 microns. It is not necessary for the carrier wavelength of the received pulses and that of the strobe pulses to have any difference whatsoever. Indeed, it is preferred that the wavelengths be the same, although this relationship is also not essential to the principle of operation of my invention. The demultiplexing receiver 18 also includes the indium antimonide semiconductive wafers 21, 22, 23, 24 and 25 which have transverse dimensions of about a centimeter and thicknesses along the beam paths between about 5 and 500 micrometers. For additional structural support, highly transparent supporting substrates of potassium chloride can be used on one or both major surfaces of each wafer except in the areas where the electrodes 21A, 21B through 25A and 25B must contact the respective wafers.

The resistivity of wafers 21–25 is illustratively 0.01 ohm-centimeter for a wafer thickness of 100 micrometers. In general, the resistivity may lie between 0.001 ohm-centimeter and 0.1 ohm-centimeter, with higher resistivities being used with thicker wafers and lower resistivities being used with lower thicknesses, for a selected sensitivity. The values chosen will also depend upon the desired response time, most easily made relatively short with a thickness in the low part of its range, and upon the desired single-pass attenuation of the light beam, which is most easily made relatively low with a resistivity in the high part of its range.

Since the modulated pulses and strobe pulses are propagating in opposite directions, the wafers 21–25 may be separated by half of the spatial separation of successive modulated pulses, which represent information in different channels. The separation of successive strobe pulses is the same as the spatial separation of successive ones of the modulated pulses for the same channel, which separation is a large multiple, equal to two times the number of channels, of the wafer spacing.

The electrodes 21A and 21B are connected to a full-wave rectifier 26, the output terminals of which are connected to a filter including resistive element 31 and capacitor 32, together providing a time constant of several times the reciprocal of the channel bit rate. The output terminals A–A′ are connected to respective terminals of the filter capacitor 32. The wafers 22–25 are connected to similar full-wave rectifiers 27–30 and filters, including the filter including resistor 33 and capacitor 34, and so forth.

Terminals A–A′ of filter capacitor 32 and the corresponding terminals of filter capacitors 34, 36, 38 and 40 are connected respectively to the inputs of inverting amplifiers 41, 44, 47, 50 and 53. The outputs of inverting amplifiers 41, 44, 47, 50 and 53 are connected to the inputs of threshold devices 42, 45, 48, 51 and 54, respectively, the characteristics and functions of which will be explained hereinafter with reference to FIG. 3. The outputs of threshold devices 42, 45, 48, 51 and 54 are connected to the inputs of pulsers 43, 46, 49, 52 and 55, respectively, which generate pulses at the channel bit rate, but only when the output of the connected threshold device is non-zero.

The outputs of pulsers 43, 46, 49, 52 and 55 are the respective channel outputs of receiver 18. At this point in the apparatus, demultiplexing is complete; and each signal is a modulated pulse train ready for decoding by known techniques and digital-to-analog conversion by known techniques, as needed.

The operation of receiver 18 of FIG. 1 may be explained as follows. In curve 111 of FIG. 3 the value along the vertical axis or ordinate represents the rectified voltage across terminals A–A′; the horizontal axis or abscissa represents time in units of the single-channel pulse repetition period. Zero time, for purposes of describing the operation, may be taken as a time prior to which only strobe pulses have passed through the detecting elements. This produces a rectified and filtered voltage across all terminals A–A′ which has a slight ripple which stays very close to the average value indicated at time zero. Photon-drag has produced a field between terminals 21A and 21B because of the transfer of momentum from propagating photons to free charge carriers in wafer 21. At a certain level of field, a circulating current within the wafer establishes equilibrium, so that charge carriers do not pile up at one surface without limit.

Upon the first coincidence of a modulated pulse with a strobe pulse in one of the wafers, say wafer 21, the photon-drag contribution to the voltage A–A′ is nonexistent because coinciding pulses have produced canceling photon-drag effects. Upon this first failure of replenishment of the rectified and filtered voltage A–A′ at time equal 2 in FIG. 3, the voltage continues to drop along an exponential decay curve readily approximated by a straight line at time equal 2 on curve 111, producing an appreciable downward excursion in voltage before a strobe pulse replenishes the voltage during the absence of a modulated pulse at time equal 3. It is readily seen that the output amplifier 41 inverts this waveform to produce curve 121 of FIG. 3 and that a suitable threshold device 42 will respond at some time between 2 and 3, as shown by curve 121, since it provides a response threshold at a level above the normal voltage excursions but below the extended excursions, so that only the latter produce an output voltage. This discrimination threshold is indicated in FIG. 3 by the dotted line cutting curve 121.

It remains to regenerate the single-channel modulated pulse train from those portions of the inverted voltage passed to the output of threshold device 42, i.e., those portions of curve 121 extending above the discrimination threshold. It will be noted that the output voltage which persists from before time equal 8 until after time equal 9 corresponds to two successive pulse coincidences in wafer 21 at times 7 and 8.

Figure 3:
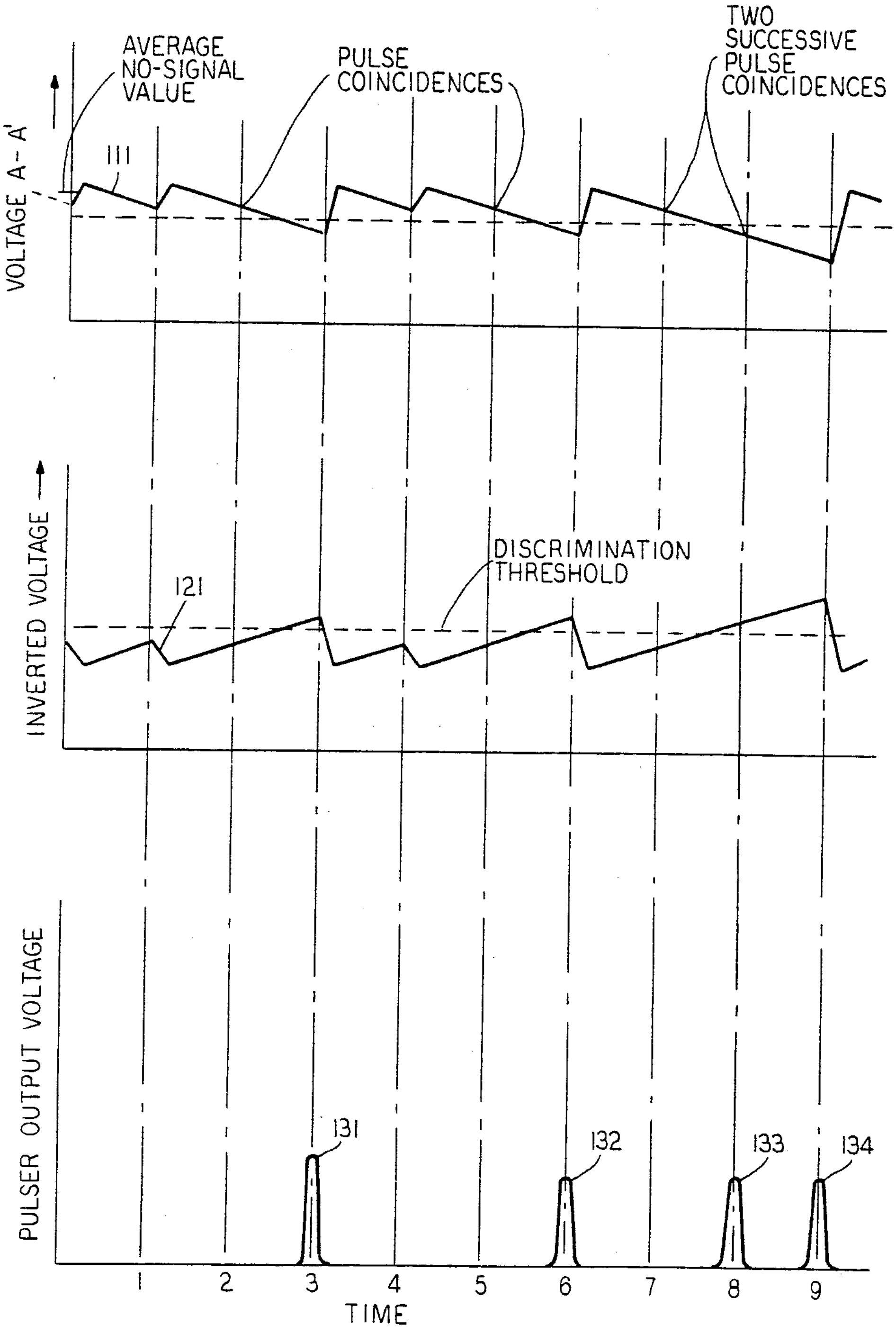
FIG. 3 is a graph containing curves showing output voltage waveforms at appropriate points in the embodiment of FIG. 1.

The appropriate output pulses are regenerated, as shown by pulses 131, 132, 133 and 134 in FIG. 3, by pulser 43. It operates as a clock-pulsing circuit of a type well known in the digital communication art, but only so long as enabled by an input voltage supplied from threshold device 42. Each of these pulses corresponds to a coincidence in the wafer 21 occurring one pulse period earlier than the illustrated output pulse.

The inverting amplifier 41 and threshold device 42 may be any suitable devices familiar in the radio art for such purpose; and, in any event, their functions could be combined in ways well known in the art. Alternatively, the threshold can be provided in pulser 43, which is then a pulse regenerator of well-known type.

The resultant output PCM pulse train for a single channel may be decoded and presented as intelligible information according to techniques well known in the PCM art.

Further details of the operation are not essential to the present invention; but the following additional information may be helpful to an understanding. The coincidence of the strobe pulse with a channel No. 5 pulse in wafer 25 would illustratively precede the coincidence of that same strobe pulse with the modulated signal from channel No. 4 in wafer 24 by just the optical propagation time of the strobe pulse between those wafers. The coincidence of the same strobe pulse with a channel No. 3 pulse in wafer 23 would follow by a like time interval, et cetera, until the one strobe pulse has passed through all the wafers and has provided a chance for coincidence with a modulated pulse from each channel. This sequence of events is repeated at the channel bit rate. The slight degradation of the pulses from wafer to wafer is not relevant to the essential principles of operation. The wafers may be AR coated to reduce this loss to a minimum.

Figure 2:
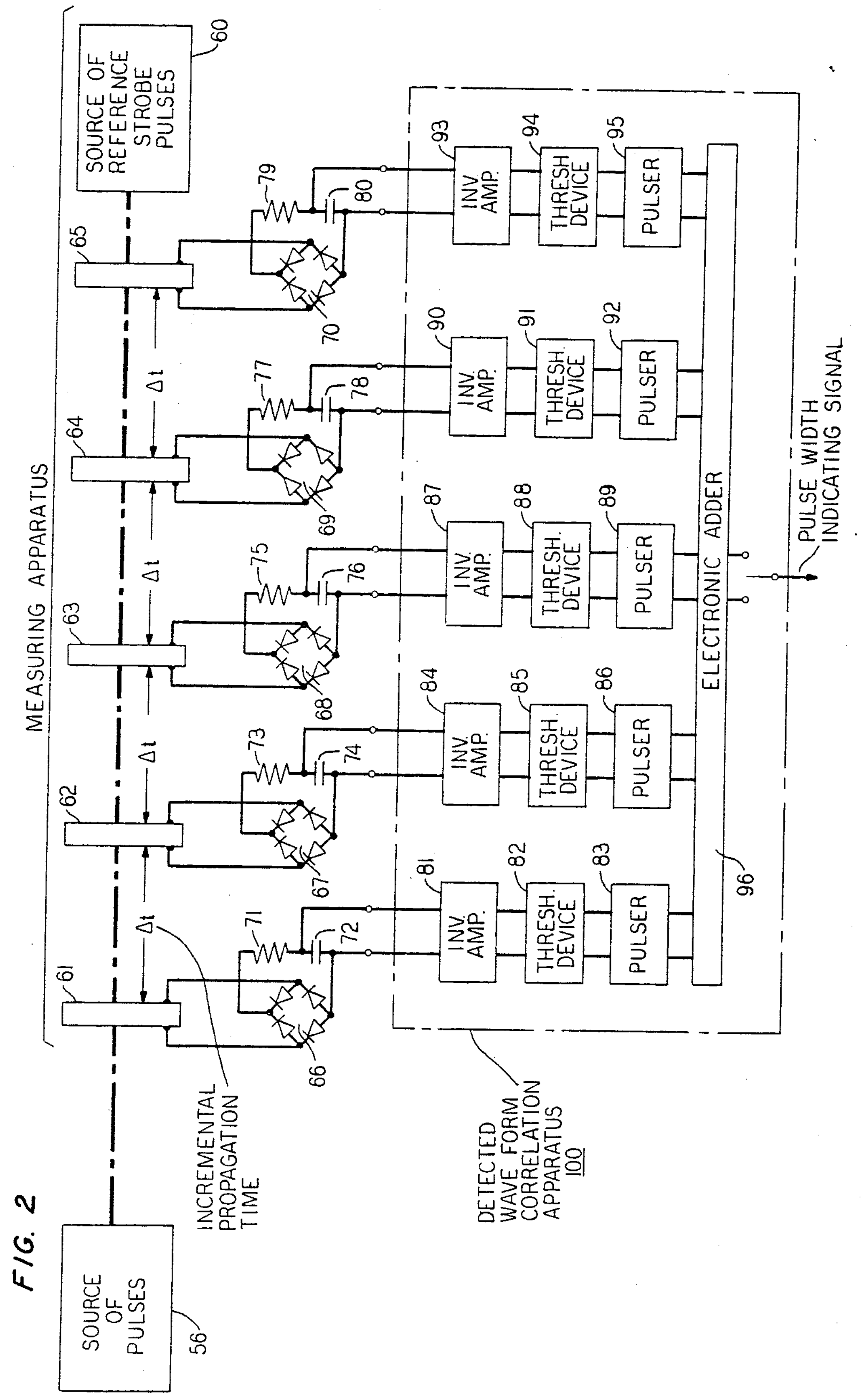
FIG. 2 is a partially schematic and partially block diagrammatic arrangement of a second embodiment of the invention employed for measuring pulse widths.

In the modified embodiment of FIG. 2, components similar to those of FIG. 1 are numbered forty digits higher. The principal difference is that pulse width measurement is the objective. The source 56 illustratively provides a periodic pulse train of which the pulses are so narrow as to be of unknown width. The strobe source 60 provides pulses at the same periodic rate. They are illustratively of known width not less than the unknown width but could also be provided by reflection of the transmitted portion of the pulses from source 56. Note that the pulse rate of the oppositely-propagating pulses from source 60 could be an integral multiple of that of source 56, but should not be a sub-multiple such as is used for demultiplexing, since it is desired that all of the wafers 61–65 respond to the same unknown pulse.

The operation of FIG. 2 differs from the operation of FIG. 1 in that the strobe pulses from source 60 and pulses from source 56 lack complete coincidence in the different wafers 61–65 by differing degrees. If the spatial overlap of the oppositely-propagating pulses is centered in the center of the array of aligned wafers 61–65, the rectified voltages therefrom will be greatest at the extremities of the array. In fact, the region of coincidence can be centered in the array by balancing the voltages at the extremities.

The pathlength of overlap of the two oppositely-propagating pulses cannot be longer than the spatial length of the shorter pulse. In this pathlength of overlap, mutually canceling effects of photon-drag will reduce the rectified voltages and produce single pulses from respective ones of pulsers 83, 86, 89, 92 and 95, as explained for the embodiment of FIG. 1. The electronic adder 96 adds these pulses from different pulsers during each passage of a pulse from source 56. In $n$ is the number of added pulses, the minimum width of the pulses from source 56 (assuming them to be no broader than those from source 60) is $(n-1)\cdot\Delta t$, where $\Delta t$ is the light propagation time between wafers. The maximum pulse width of those pulses is $(n+1)\cdot\Delta t$. Obviously, the range of uncertainty of determination of the pulse width can be reduced by increasing the number of photon-drag detectors and reducing their spacing, thereby reducing $\Delta t$.

The pulse width measurement can also be made with a single photon-drag detector by moving it along the light propagation path, for example, on a suitable track and determining the pathlength of overlap as if it had remained constant throughout the test period. Since this modified measurement employs a large number of successive pulses from both sources, they must be reliably periodic and of substantially constant width.

I claim:

1. A device responsive to received optical pulses recurring at integral multiples of a particular period, comprising a plurality of optically-transmissive elements capable of a substantial photon-drag effect, said elements being aligned along the path of said pluses propagating in a first direction therethrough and separated by equal distances not larger than half of the distance propagated by light in said particular period, means for supplying pulses propagating in a second direction opposite to said first direction and recurring with a period integrally related to said particular period, means for sensing in each element a field responsive to said photon-drag effect to produce a voltage, and means for processing said voltages to provide an indication of information pertaining to the coincidence of said received pulses.

2. A device according to claim 1 in which the pulses are time-division-multiplexed pulses in trains, said trains recurring periodically with a period equal to the inter-pulse period of an individual channel to represent within each train information in a plurality of channels, the particular period being the smallest inter-pulse time interval within said train, the means for supplying oppositely-propagating pulses comprises a source of strobe pulses recurring with a period equal to the inter-pulse period of said individual channel, the sensing means comprise a pair of electrodes for each wafer, said electrodes contacting opposite surfaces of said wafer along the path of said pulses, the processing means including a rectifying circuit coupled to each pair of electrodes, means for inverting the output of each rectifying circuit, and means responsive to each inverting means for regenerating pulses representing information in a respective channel.

3. A device according to claim 1 in which the received optical pulses have unknown widths to be measured, the particular period being the smallest inter-pulse interval between said pulses, the means for supplying oppositely-propagating pulses provides strobe pulses with a period that is not greater than said particular period, said device including means for adding simultaneous coincidences of a received pulse and an oppositely-propagating strobe pulse in different ones of said elements to provide an output indicative of the unknown width of said pulse.

4. A device according to claim 1 in which the elements are wafers of a semiconductive material exhibiting the photon-drag effect.

5. A device according to claim 1 in which the elements are bodies each of which includes material of the class of materials known as low-effective-mass semiconductors.

* * * * *